(12) United States Patent
Fletcher

(10) Patent No.: US 8,984,506 B2
(45) Date of Patent: Mar. 17, 2015

(54) TECHNIQUES FOR DYNAMICALLY DISCOVERING AND ADAPTING RESOURCE AND RELATIONSHIP INFORMATION IN VIRTUALIZED COMPUTING ENVIRONMENTS

(75) Inventor: James C. Fletcher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 12/986,334

(22) Filed: Jan. 7, 2011

(65) Prior Publication Data

US 2012/0180041 A1    Jul. 12, 2012

(51) Int. Cl.
   *G06F 9/455*   (2006.01)
   *G06F 9/46*    (2006.01)
   *G06F 15/173*  (2006.01)

(52) U.S. Cl.
   CPC .. *G06F 9/45558* (2013.01); *G06F 2009/45591* (2013.01)
   USPC ............... 718/1; 718/100; 718/104; 718/105; 709/223; 709/224; 709/226

(58) Field of Classification Search
   None
   See application file for complete search history.

(56) References Cited

U.S. PATENT DOCUMENTS

| | | | |
|---|---|---|---|
| 6,847,993 B1 | 1/2005 | Novaes et al. | |
| 7,516,206 B2 | 4/2009 | Henseler et al. | |
| 7,590,653 B2 | 9/2009 | Sparks | |
| 7,627,745 B2 | 12/2009 | Martinez et al. | |
| 7,685,148 B2 | 3/2010 | Engquist et al. | |
| 7,865,893 B1 * | 1/2011 | Omelyanchuk et al. | 718/1 |
| 7,925,923 B1 * | 4/2011 | Hyser et al. | 714/13 |
| 2005/0251808 A1 * | 11/2005 | Gbadegesin et al. | 719/310 |
| 2005/0268298 A1 * | 12/2005 | Hunt et al. | 718/1 |
| 2006/0130052 A1 * | 6/2006 | Allen et al. | 717/172 |
| 2007/0300223 A1 * | 12/2007 | Liu | 718/1 |
| 2008/0184068 A1 | 7/2008 | Mogi et al. | |
| 2008/0270564 A1 * | 10/2008 | Rangegowda et al. | 709/212 |
| 2009/0106256 A1 * | 4/2009 | Safari et al. | 707/10 |
| 2010/0161922 A1 * | 6/2010 | Sharp et al. | 711/162 |
| 2010/0169537 A1 * | 7/2010 | Nelson | 711/6 |
| 2010/0175070 A1 | 7/2010 | Baba | |
| 2010/0180274 A1 * | 7/2010 | Cherian et al. | 718/1 |
| 2011/0138381 A1 * | 6/2011 | Hauser | 718/1 |
| 2011/0265164 A1 * | 10/2011 | Lucovsky et al. | 726/7 |
| 2011/0296022 A1 * | 12/2011 | Ferris et al. | 709/226 |
| 2012/0054409 A1 * | 3/2012 | Block et al. | 711/6 |

* cited by examiner

*Primary Examiner* — Charles Swift
(74) *Attorney, Agent, or Firm* — Yudell Isidore PLLC; Thomas E Tyson

(57) ABSTRACT

A technique for dynamically discovering and adapting resource and relationship information in virtualized computing environments including receiving, by a discovery manager, a discovery request for a virtual machine image that was created within a virtualized computing environment. The technique also includes using the discovery manager to discover resource and relationship information for the virtual machine image in response to the discovery request. The technique also includes invalidating, using the discovery manager, the resource and relationship information in response to receipt of an invalidate request for the virtual machine image. The resource and relationship information is then stored in a database using the discovery manager.

20 Claims, 6 Drawing Sheets

TECHNIQUES FOR DYNAMICALLY DISCOVERING AND ADAPTING RESOURCE AND RELATIONSHIP INFORMATION IN VIRTUALIZED COMPUTING ENVIRONMENTS

BACKGROUND

1. Technical Field

The present invention generally relates to techniques for dynamically discovering and adapting resource and relationship information in computing environments and in particular to techniques for dynamically discovering and adapting resource and relationship information in virtualized computing environments.

2. Description of the Related Art

In general, cloud computing refers to Internet-based computing where shared resources, software, and information are provided to users of computer systems and other electronic devices (e.g., mobile phones) on demand, similar to the electricity grid. Adoption of cloud computing has been aided by the widespread utilization of virtualization, which is the creation of a virtual (rather than actual) version of something, e.g., an operating system, a server, a storage device, network resources, etc. A virtual machine (VM) is a software implementation of a physical machine (e.g., a computer system) that executes instructions like a physical machine. VMs are usually categorized as system VMs or process VMs. A system VM provides a complete system platform that supports the execution of a complete operating system (OS). In contrast, a process VM is usually designed to run a single program and support a single process. A VM characteristic is that application software running on the VM is limited to the resources and abstractions provided by the VM. System VMs (also referred to as hardware VMs) allow the sharing of the underlying physical machine resources between different VMs, each of which executes its own OS. The software that provides the virtualization and controls the VMs is typically referred to as a VM monitor (VMM) or hypervisor. A hypervisor may run on bare hardware (Type 1 or native VMM) or on top of an operating system (Type 2 or hosted VMM).

Cloud computing provides a consumption and delivery model for information technology (IT) services based on the Internet and involves over-the-Internet provisioning of dynamically scalable and usually virtualized resources. Cloud computing is facilitated by ease-of-access to remote computing websites (e.g., via the Internet or a private corporate network) and frequently takes the form of web-based tools or applications that a cloud consumer can access and use through a web browser, as if the tools or applications were a local program installed on a computer system of the cloud consumer. Commercial cloud implementations are generally expected to meet quality of service (QoS) requirements of consumers and typically include service level agreements (SLAs). Cloud consumers avoid capital expenditures by renting usage from a cloud vendor (i.e., a third-party provider). In a typical cloud implementation, cloud consumers consume resources as a service and pay only for resources used.

Conventional 'discovery' technologies have, for example, been configured to discover various information (e.g., physical servers, operating systems (OSs), application instances, associated databases, and application servers) about a computing environment. Conventionally, discovery technologies have employed 'network crawlers' or 'resource analyzers' to ascertain resources utilized by an application and the relationships of the application to other resources in a computing environment. The discovered information has then been associated with, for example, an associated service to determine the impact of events, e.g., failures and planned outages, on the service.

In conventional application hosting environments, applications have been installed on a physical machine. Through discovery technologies, resource information associated with an application running on a physical machine in a computing environment and relationship information of the application to other components in the computing environment has been determined. The discovered information (i.e., the resource information and the relationship information for the application) has been stored in persistent storage and has occasionally been updated to reflect changes. Due to the relatively static nature of conventional computing environments, an occasional update to the discovered information has usually been acceptable to meet customer requirements. For example, in conventional computing environments, physical servers have usually hosted an application continuously for months or years. In this case, discovered information is valid for a relatively long time period. In general, conventional discovery technologies have provided acceptable accuracy when employed in conventional computing environments that have exhibited relatively static natures with respect to underlying physical infrastructures.

BRIEF SUMMARY

Disclosed are a method, a data processing system, and a computer program product (embodied in a computer-readable storage medium) for dynamically discovering and adapting resource and relationship information in virtualized computing environments.

A technique for dynamically discovering and adapting resource and relationship information in virtualized computing environments includes receiving, by a discovery manager, a discovery request for a virtual machine image that was created within a virtualized computing environment. The technique also includes using the discovery manager to discover resource and relationship information for the virtual machine image in response to the discovery request. The technique further includes invalidating, using the discovery manager, the resource and relationship information in response to receipt of an invalidate request for the virtual machine image. The resource and relationship information is then stored in a database using the discovery manager. The invalidate request may be received, for example, in response to deactivation or migration of the virtual machine image.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
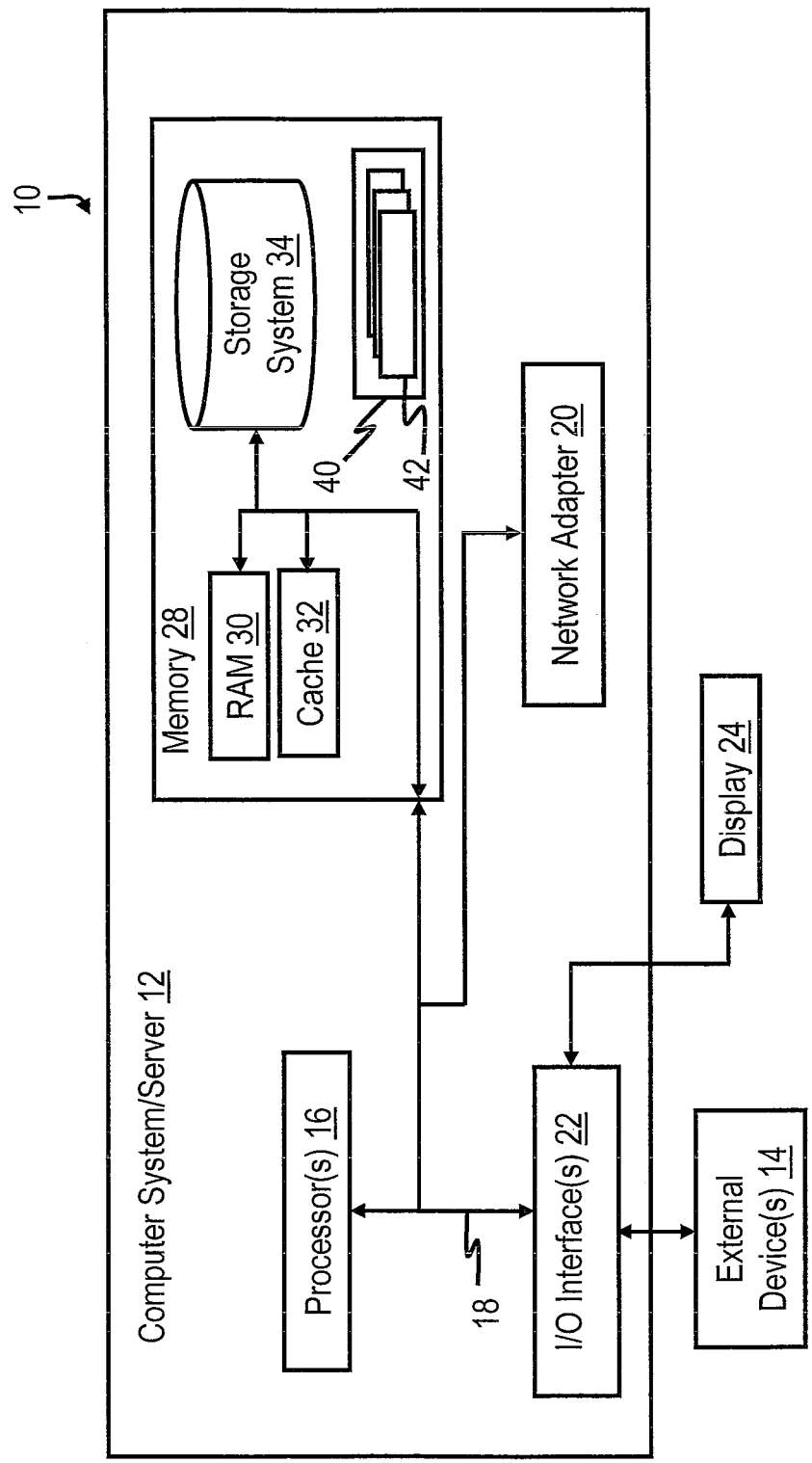
FIG. 1 depicts a relevant portion of an exemplary cloud computing node that is configured according to an embodiment of the present disclosure.

The illustrative embodiments provide a method, a data processing system, and a computer program product (embodied in a computer-readable storage medium) for dynamically discovering and adapting resource and relationship information in virtualized computing environments.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

As alluded to above, conventional discovery technologies may not provide acceptable accuracy when employed in virtualized computing environments that exhibit dynamic natures. For example, virtual machine (VM) images (which provide all resources required to execute an application on a server) in a virtualized computing environment can be dynamically deployed onto different physical hardware with each execution of a VM image. Moreover, VM images can be dynamically replicated within a machine and/or migrated within a machine and/or to a different machine. While migrating VM images causes discovered information (associated with the migrated VM image) to be invalid, rediscovery may not take place for a relatively long period of time when conventional discovery technologies are employed. In this case, a time lag associated with rediscovery may not be acceptable to meet customer requirements in virtualized computing environments.

According to various aspects of the present disclosure, when a VM image is created by a virtual machine monitor (VMM) of a deployed virtualization technology, a discovery manager is notified (by the VMM) to initiate an update of the computing environment information (i.e., resource and relationship information) for the VM image and any associated environments. In response to the notification, the discovery manager collects resource and relationship information for the deployed VM image. The discovery manager then initiates storage of the updated resource and relationship information for the VM image. According to another aspect of the present disclosure, when a VM image is migrated (e.g., moved on a physical server or from one physical server to another physical server), the VMM initiates discovery (by the discovery manager) to update resource and relationship information for the migrated VM image. According to one or more embodiments, when a VM image completes execution and is removed (deactivated) from the computing environment (by an associated VMM), the VMM communicates an invalidate signal (for the removed VM image) to the discovery manager. In response to the invalidate signal, the discovery manager invalidates all resource and relationship information for the removed VM image and any associated environments.

It should be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Cloud characteristics may include: on-demand self-service; broad network access; resource pooling; rapid elasticity; and measured service. Cloud service models may include: software as a service (SaaS); platform as a service (PaaS); and infrastructure as a service (IaaS). Cloud deployment models may include: private cloud; community cloud; public cloud; and hybrid cloud.

On-demand self-service means a cloud consumer can unilaterally provision computing capabilities, such as server time and network storage, as needed automatically without requiring human interaction with a service provider. Broad network access means capabilities are available over a network and accessed through standard mechanisms that promote use by heterogeneous thin or thick client platforms (e.g., mobile phones, laptops, and personal digital assistants (PDAs)). Resource pooling means computing resources of a provider are pooled to serve multiple consumers using a multi-tenant model, with different physical and virtual resources dynamically assigned and reassigned according to demand. In resource pooling there is a sense of location independence in that the consumer generally has no control or knowledge over the exact location of the provided resources but may be able to specify location at a higher level of abstraction (e.g., country, state, or datacenter).

Rapid elasticity means capabilities can be rapidly and elastically provisioned, in some cases automatically, to quickly scale-out and be rapidly released to quickly scale-in. To the consumer, the capabilities available for provisioning often appear to be unlimited and can be purchased in any quantity at any time. Measured service means cloud systems automatically control and optimize resource use by leveraging a metering capability at some level of abstraction that is appropriate to the type of service (e.g., storage, processing, bandwidth, and active user accounts). Resource usage can be monitored, controlled, and reported providing transparency for both the provider and consumer of the utilized service.

In an SaaS model the capability provided to the consumer is to use applications of a provider that are running on a cloud infrastructure. The applications are accessible from various client devices through a thin client interface such as a web browser (e.g., web-based e-mail). In the SaaS model, the consumer does not manage or control the underlying cloud infrastructure (including networks, servers, operating systems, storage, or even individual application capabilities), with the possible exception of limited user-specific application configuration settings.

In a PaaS model a cloud consumer can deploy consumer-created or acquired applications (created using programming languages and tools supported by the provider) onto the cloud infrastructure. In the PaaS model, the consumer does not manage or control the underlying cloud infrastructure (including networks, servers, operating systems, or storage), but has control over deployed applications and possibly application hosting environment configurations.

In an IaaS service model a cloud consumer can provision processing, storage, networks, and other fundamental computing resources where the consumer is able to deploy and run arbitrary software (which can include operating systems and applications). In the IaaS model, the consumer does not manage or control the underlying cloud infrastructure but has control over operating systems, storage, deployed applications, and possibly limited control of select networking components (e.g., host firewalls).

In a private cloud deployment model the cloud infrastructure is operated solely for an organization. The cloud infrastructure may be managed by the organization or a third party and may exist on-premises or off-premises. In a community cloud deployment model the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises. In a public cloud deployment model the cloud infrastructure is made available to the general public or a large industry group and is owned by an organization selling cloud services.

In a hybrid cloud deployment model the cloud infrastructure is a composition of two or more clouds (private, community, or public) that remain unique entities but are bound together by standardized or proprietary technology that enables data and application portability (e.g., cloud bursting for load-balancing between clouds). In general, a cloud computing environment is service oriented with a focus on statelessness, low coupling, modularity, and semantic interoperability. At the heart of cloud computing is an infrastructure that includes a network of interconnected nodes.

With reference to FIG. 1, a schematic of an exemplary cloud computing node 10 is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth herein. Cloud computing node 10 includes a computer system/server 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 (in cloud computing node 10) is illustrated in the form of a general-purpose computing device. The components of computer system/server 12 may include, but are not limited to, one or more processors or processing units (including one or more processor cores) 16, a system memory 28, and a bus 18 that couples various system components (including system memory 28) to processors 16. Bus 18 represents one or more of any of several types of bus structures, including a memory bus or memory controller bus, a peripheral bus, an accelerated graphics port, and a processor or local bus using any of a variety of bus architectures. By way of example, and not limitation, such architectures include the industry standard architecture (ISA) bus, the micro channel architecture (MCA) bus, the enhanced ISA (EISA) bus, the video electronics standards association (VESA) local bus, and the peripheral components interconnect (PCI) bus.

Computer system/server 12 typically includes a variety of computer system readable media. Such media may be any available media that is accessible by computer system/server 12, and includes both volatile and non-volatile media, removable and non-removable media. System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, nonvolatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces.

As will be further depicted and described herein, memory 28 may include at least one program product having a set (e.g., at least one) of program modules that are configured to carry out the functions of various disclosed embodiments. Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, redundant array of inexpensive disk (RAID) systems, tape drives, and data archival storage systems, etc.

Figure 2:
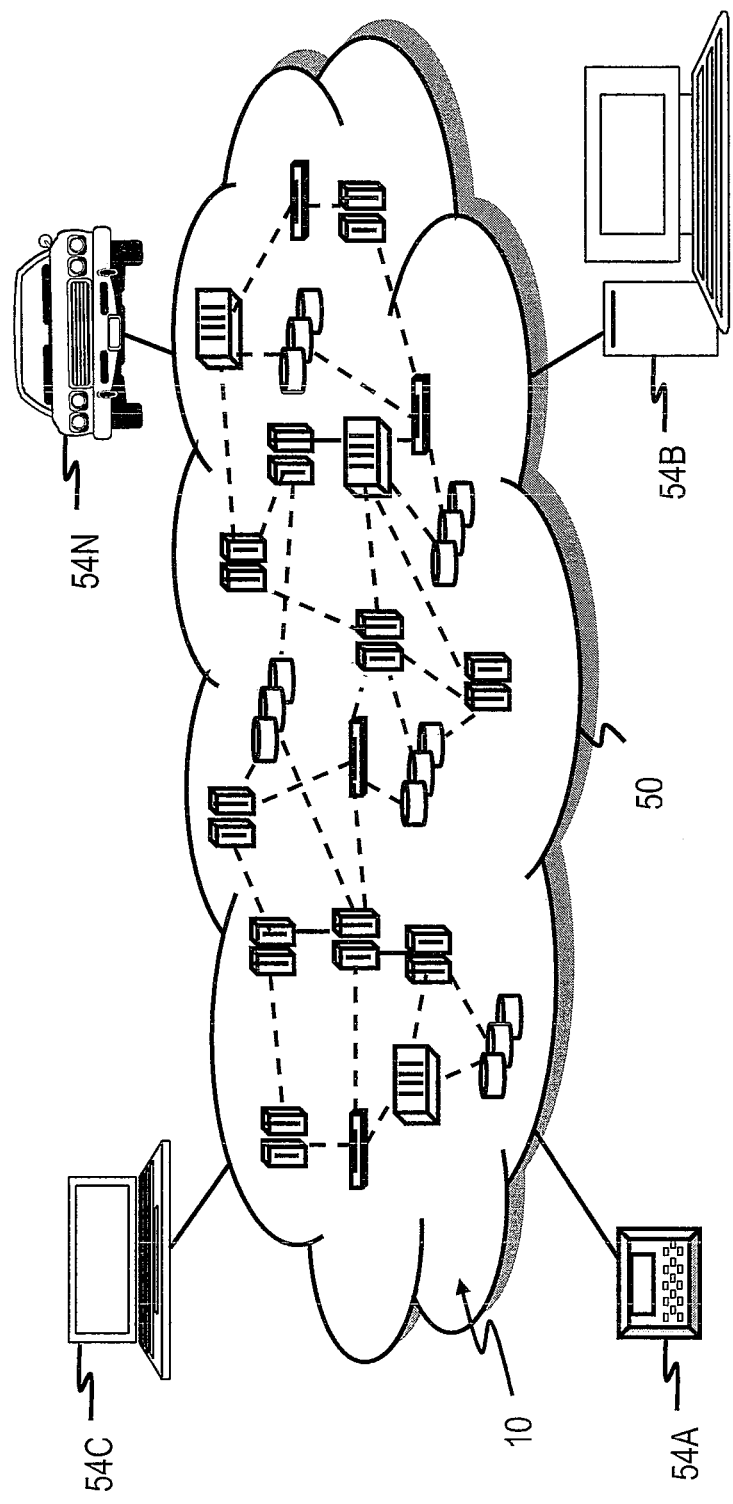
FIG. 2 depicts a relevant portion of an exemplary cloud computing environment that is configured according to an embodiment of the present disclosure.

With reference to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. Nodes 10 may communicate with one another and may be grouped (not shown) physically or virtually, in one or more networks, such as private, community, public, or hybrid clouds as described herein, or a combination thereof. In this manner, cloud computing environment 50 can offer infrastructure, platforms and/or software as services for which a cloud consumer does not need to maintain resources on a local computing device. It should be understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
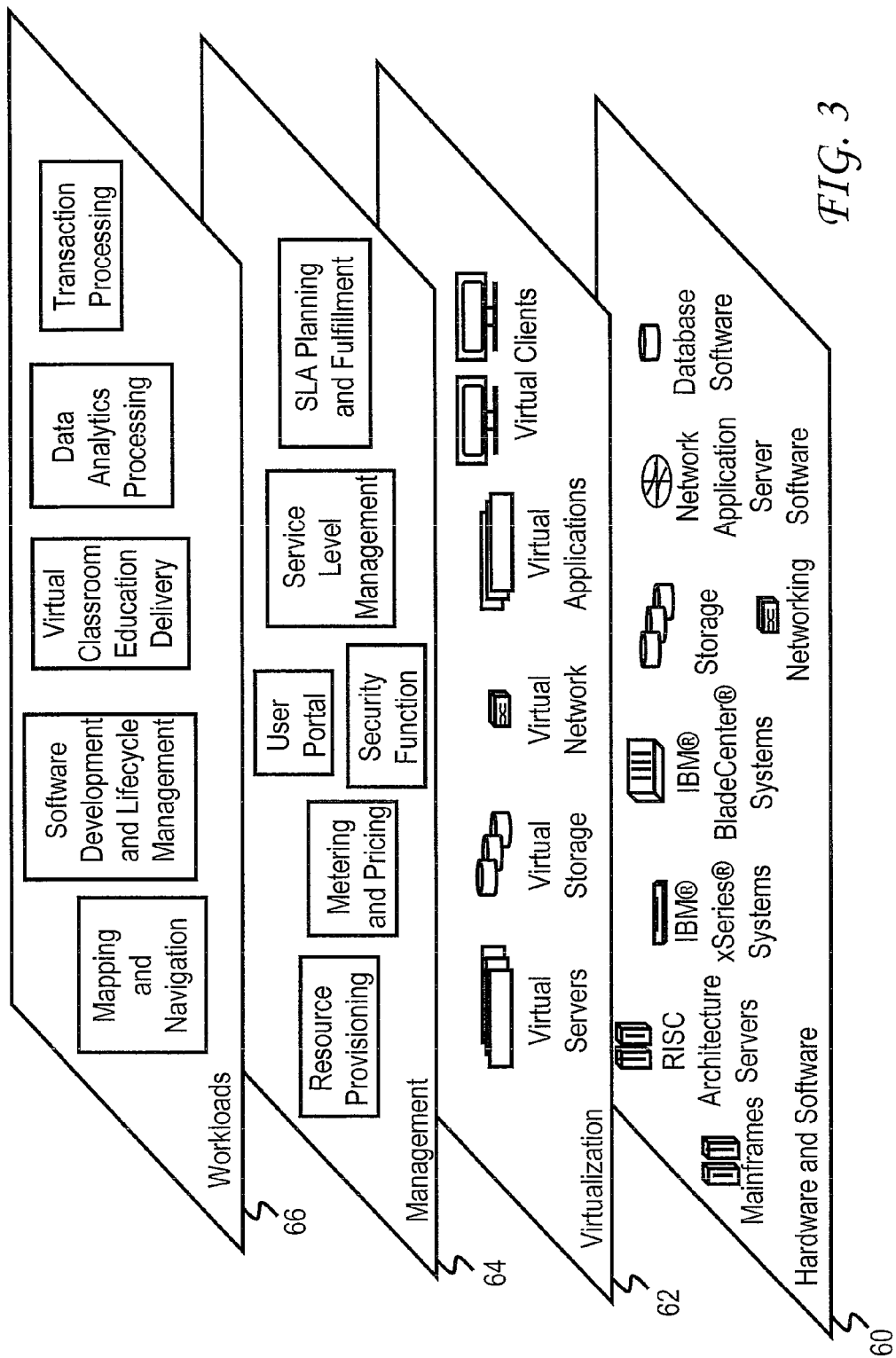
FIG. 3 depicts exemplary abstraction model layers of a cloud computing environment configured according to an embodiment of the present disclosure.

With reference to FIG. 3, a set of functional abstraction layers provided by cloud computing environment 50 (FIG. 2) is shown. It should be understood that the components, layers, and functions shown in FIG. 3 are intended to be illustrative only and embodiments of the invention are not limited thereto. As depicted in FIG. 3, cloud computing environment 50 includes a hardware and software layer 60, a virtualization layer 62, a management layer 64, and a workloads layer 66.

Hardware and software layer 60 includes various hardware and software components. As one example, the hardware components may include mainframes (e.g., IBM® zSeries® systems), reduced instruction set computer (RISC) architecture based servers (e.g., IBM pSeries® systems), IBM xSeries® systems, IBM BladeCenter® systems, storage devices, networks and networking components. As another example, the software components may include network application server software (e.g., IBM WebSphere® application server software) and database software (e.g., IBM DB2™, database software). IBM, zSeries, pSeries, xSeries, BladeCenter, WebSphere, and DB2 are trademarks of International Business Machines Corporation registered in many jurisdictions worldwide.

Virtualization layer 62 provides an abstraction layer in which virtual entities (e.g., virtual servers, virtual storage, virtual networks (including virtual private networks), virtual applications and operating systems, and virtual clients are included. As previously discussed, these virtual entities may be accessed by clients of cloud computing environment 50 on-demand. The virtual entities are controlled by one or more virtual machine monitors (VMMs) that may, for example, be implemented in hardware and software layer 60, virtualization layer 62, or management layer 64.

Management layer 64 provides various functions (e.g., resource provisioning, metering and pricing, security, user portal, service level management, and SLA planning and fulfillment). The resource provisioning function provides dynamic procurement of computing resources and other resources that are utilized to perform tasks within the cloud computing environment. For example, the resource provisioning function may be performed for virtual machines (VMs) by one or more VMMs. The metering and pricing function provides cost tracking (as resources are utilized within the cloud computing environment) and billing or invoicing for consumption of the utilized resources. As one example, the utilized resources may include application software licenses.

The security function provides identity verification for cloud consumers and tasks, as well as protection for data and other resources. The user portal function provides access to the cloud computing environment for consumers and system administrators. The service level management function provides cloud computing resource allocation and management such that required service levels are met. For example, the security function or service level management function may be configured to limit deployment/migration of a virtual machine (VM) image to geographical location indicated to be acceptable to a cloud consumer. The service level agreement (SLA) planning and fulfillment function provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

As workloads are moved into virtualized computing environments (or cloud instantiations of virtualized computing environments), discovered information (i.e., resource and relationship information on virtual machine (VM) images) may have a lifecycle of minutes to hours, or even seconds. In general, utilizing conventional discovery technologies results in dated and inaccurate discovered information for virtualized computing environments. According to one or more aspects of the present disclosure, a 'discover now' and an 'invalidate now' interface are implemented in a virtual machine monitor (VMM) of a virtualized computing environment such that as VM images are created or destroyed associated discovery information can be updated (with minimal additional overhead) to provide a near real-time view of the virtualized computing environment.

According to one or more embodiments of the present disclosure, when a VM image is dispatched, discovery for the VM image is initiated (by an associated VMM) to facilitate determination and recordation of the resources and relationships for the VM image. According to other aspects of the present disclosure, when a VM image is no longer in use, invalidation of resource and relationship information is initiated (by an associated VMM). Invalidation of resource and relationship information for a VM image that is not longer in use is desirable to provide an accurate picture (i.e., remove incorrect resource and relationship information from an associated discovery system) of an associated virtualized computing environment. In this manner, more timely (i.e., near real-time) resource and relationship information is provided to enhance awareness of VM images and an associated virtualized computing environment. It should be appreciated that the disclosed techniques are valid for virtualized computing environments in particular and cloud computing environments in general. The disclosed techniques usually provide greater value when deployed in computing environments that employ VM images with relatively short life spans.

According to various aspects of the present disclosure, when a VM image is created by a VMM of a deployed virtualization technology, creation awareness of the VM image is provided (by the VMM) to a discovery manager (which may be, for example, implemented within virtualization layer 62 as a virtual application). According to one or more embodiments, when a VM image is deployed, the discovery manager executes to collect resource and relationship information for the deployed VM image. The discovery manager then initiates storage of the resource and relationship information for the VM image. According to another aspect of the present disclosure, when a VM image is migrated (e.g., moved on a physical server or from one physical server to another physical server), the VMM initiates discovery to update resource and relationship information. According to one or more embodiments, when a VM image completes execution and is removed from the computing environment (by an associated VMM), the VMM communicates an invalidate signal (for the removed VM image) to the discovery manager. In response to the invalidate signal, the discovery manager invalidates all resource and relationship information for the removed VMM.

It should be appreciated that various active discovery technologies and various virtualization technologies may be modified to implement embodiments of the present disclosure. As one example, the Tivoli Application Dependency Discovery Manager (TADDM)™, which is configured to scan a computing environment and gather detailed information about the computing environment and relationships between resources in the environment, may be modified to implement aspects of the present disclosure. For example, the TADDM™ modified according to aspects of the present disclosure may be utilized to facilitate near real-time visualization of interdependencies and relationships between applications, computer systems, and network devices through application mapping and agentless, credential-free discovery capabilities. In one or more alternative embodiments, one or more agents may be deployed to implement aspects of the present disclosure.

Figure 4:
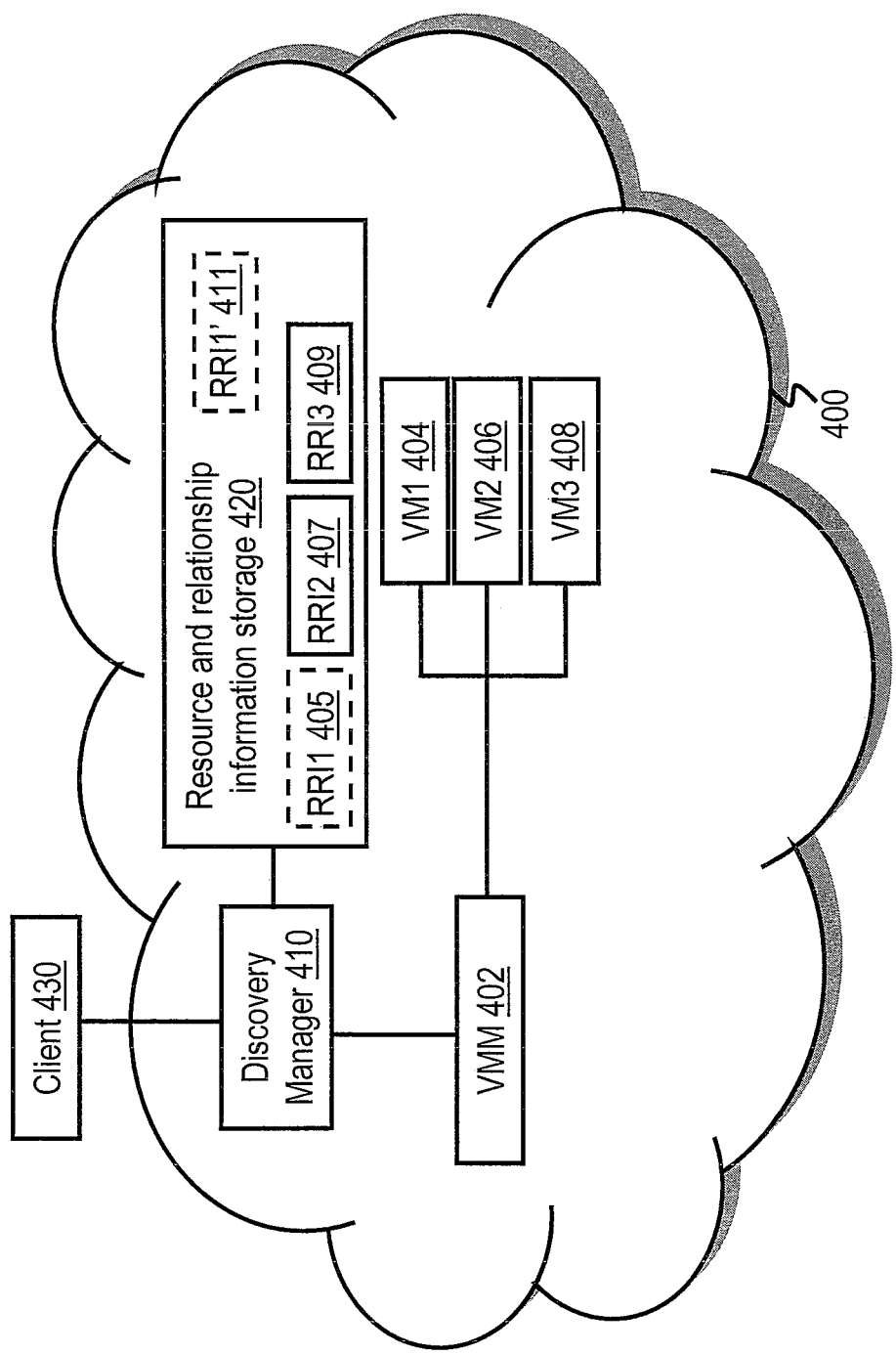
FIG. 4 is a diagram of a relevant portion of an exemplary cloud computing environment that includes a discovery manager (executing on a data processing system) configured in accordance with various embodiments of the present disclosure to dynamically discover and adapt resource and relationship information.

With reference to FIG. 4, an exemplary cloud computing environment 400 includes a discovery manager 410 (executing on a data processing system) that is in communication with a virtual machine monitor (VMM) 402 that controls multiple virtual machines (VMs), e.g., VM1 404, VM2 406, and VM3 408 (executing on one or more data processing systems). VMM 402 may execute on the same server as discovery manager 410 or on a different server. Similarly, VMM 402 may execute on the same server as VM1 404, VM2 406, and VM3 408 or on a different server. Discovery manager 410 is also in communication with a resource and relationship storage (e.g., a database located on a hard disk drive (HDD) or flash drive) 420 and a client 430. Responsive to a request by client 430, discovery manager 410 provides relevant resource and relationship information for one or more VM images associated with client 430. VMM 402 is configured to initiate discovery when VMM 402 creates/terminates a VM image. By tying search (discovery) initiation to the creation of a VM image (by VMM 402), an immediate awareness of VM image resources and relationships may be facilitated.

In response to VMM 402 terminating a VM image, discovery manager 410 invalidates (responsive to VMM 402 signaling discovery manager 410 that the VM image has been terminated) discovery information for the terminated VM image. According to various embodiments, when a VM image (e.g., one or more of VM1 404, VM2 406, and VM3 408) is migrated, VMM 402 generates an 'invalidate' signal to discovery manager 410 and follows the 'invalidate' signal with a 'discover' signal such that discovery manager 410 obtains new information for the migrated VM image in cloud computing environment 400. While only three VMs are illustrated in cloud computing environment 400, it should be appreciated that more or less than three VMs may be implemented within a cloud computing environment configured according to the present disclosure. VMs 404, 406, and 408 may execute on different servers located in different geographical locations (e.g., different states (e.g., Texas, Missouri, and Michigan) within the United States or different countries (e.g., Canada, Mexico, and the United States)) or on one or more servers located in a same geographical location.

Figure 5:
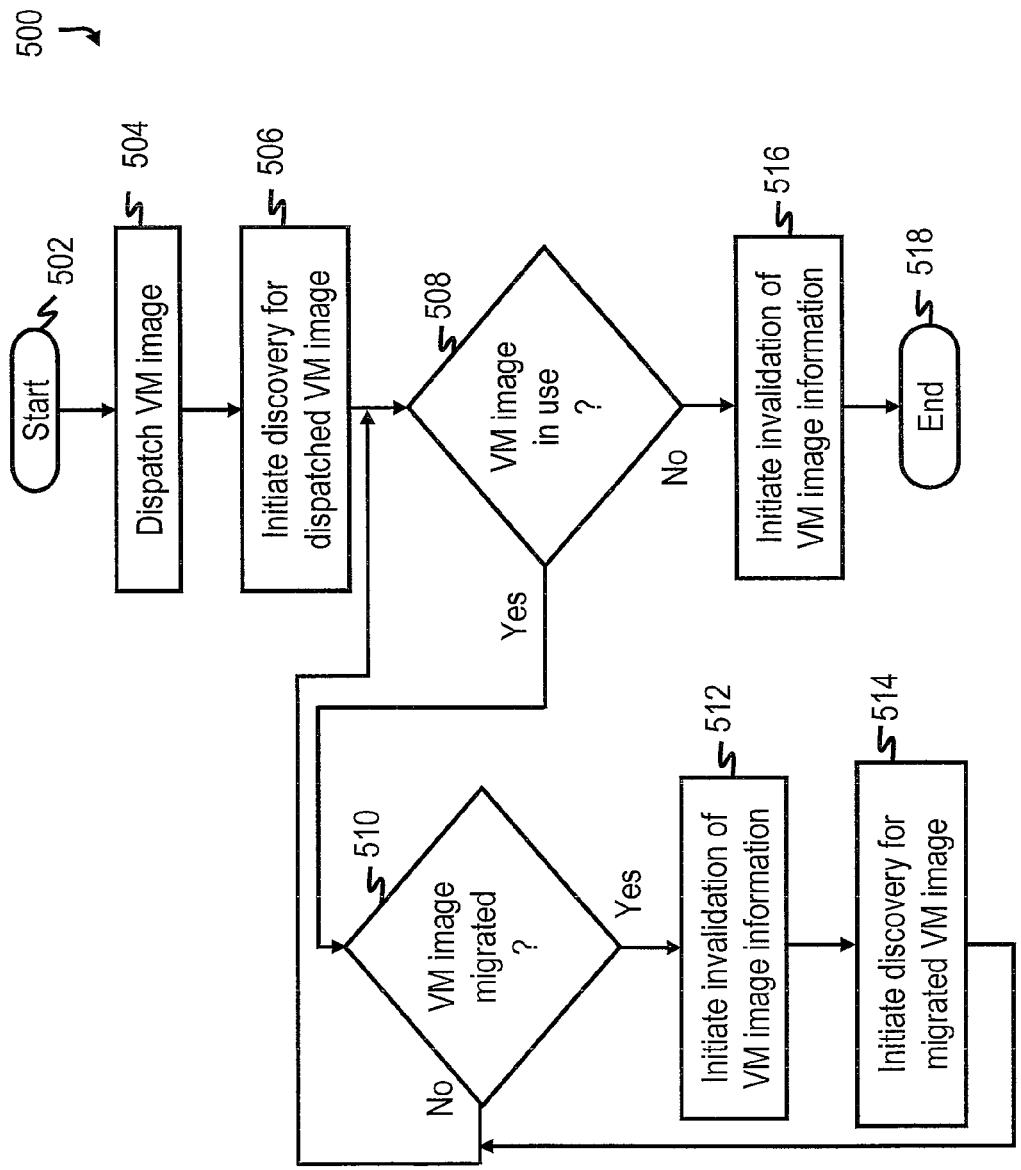
FIG. 5 is a flow chart for an exemplary process that implements techniques for dynamically discovering and adapting resource and relationship information according to various embodiments of the present disclosure.

With reference to FIG. 5, a flow chart for an exemplary resource and relationship adaptation process 500 (configured according to an embodiment of the present disclosure) is illustrated. For ease of understanding, process 500 (which executes on VMM 402) is described in conjunction with cloud computing environment 400 of FIG. 4. Process 500 begins (e.g., in response to a request by a cloud consumer for services) at block 502, at which point control transfers to block 504. In block 504, VMM 402 dispatches a VM image to a server (within cloud computing environment 400) to provide a service for a cloud consumer. While the discussion herein focuses on the dispatching of a single VM image, it should be appreciated that the techniques disclosed herein are broadly applicable to the dispatching of one of more VM images to one or more servers to service a workload.

Next, in block 506, VMM 402 initiates discovery for the dispatched VM image by generating a discovery request to discovery manager 410, which services the discovery request, for example, in accordance with process 600 of FIG. 6, which is described below. Then, in decision block 508, VMM 402 determines if the VM image is still in use. While the VM image is still in use, control transfers to decision block 510. In response to the VM image no longer being in use in block 506 (e.g., VMM 402 terminates a service in response to a request from client 430 or in response to completion of a requested service), control transfers to block 516. In block 516, VMM 402 initiates invalidation of resource and relationship information for the terminated VM image by communicating an invalidate request to discovery manager 402, which services the invalidate request, for example, in accordance with process 700 of FIG. 7 described below. Following block 516, control transfers to block 518 where process 500 ends and control returns to a calling process.

In block 510, VMM 402 determines whether the VM image is to be migrated. For example, VMM 402 may decide to migrate the VM image to balance a load on physical servers within cloud computing environment 400 to comply with an SLA, to provision for an expected or requested increase of services, to offload workload on a platform requiring service, etc. In response to a decision not to migrate the VM image, control transfers to block 508. In response to a decision to migrate the VM image, control transfers to block 512. In block 512, VMM 402 migrates the VM image and initiates invalidation of the resource and relationship information for the VM image by communicating an invalidate request to discovery manager 410. Next, in block 514, VMM 402 initiates discovery for the migrated VM image by communicating a discovery request (for the migrated VM image) to discovery manager 410. Following block 514, control transfers to block 508, which has been described.

Figures 6, 7:
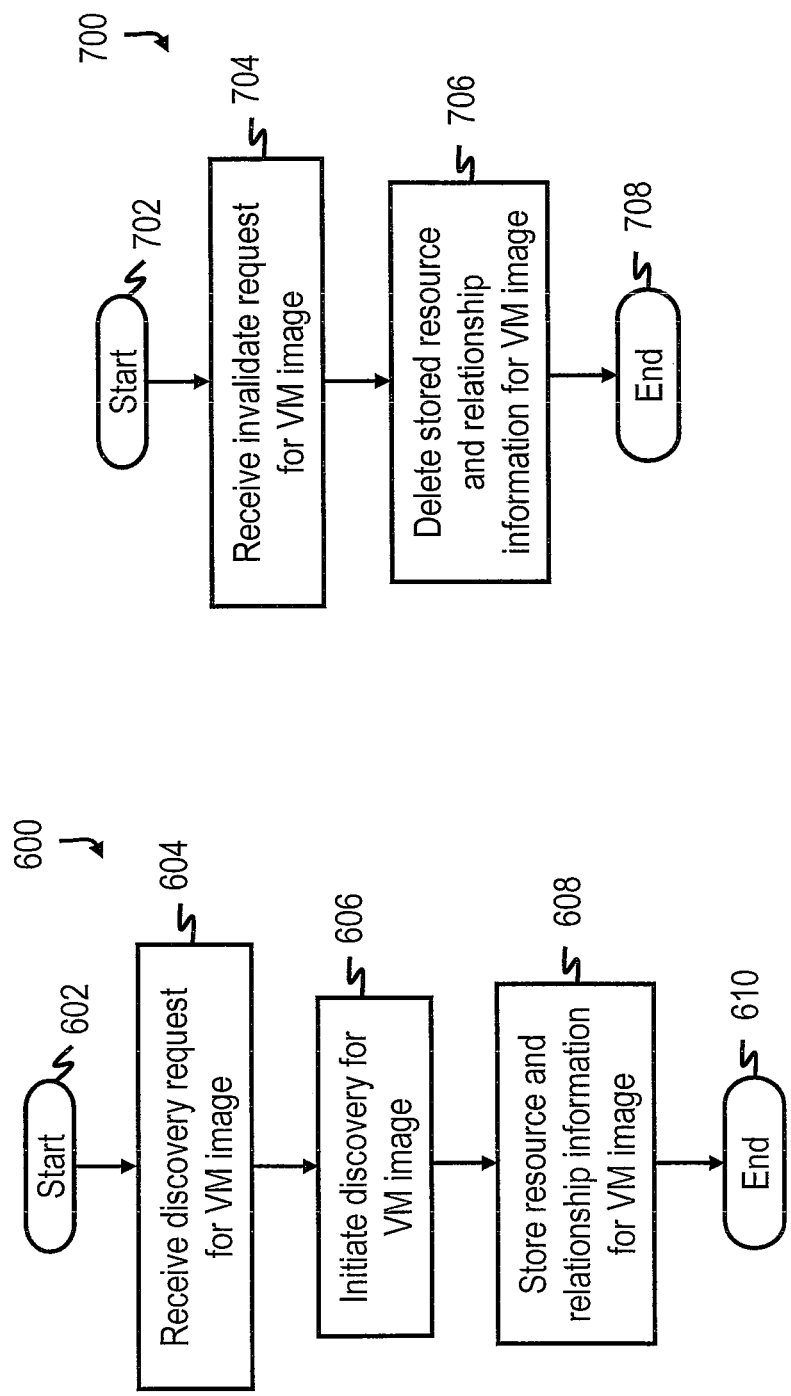
FIG. 6 is a flow chart for another exemplary process that implements techniques for dynamically discovering and adapting resource and relationship information according to various embodiments of the present disclosure.
FIG. 7 is a flow chart for yet another exemplary process that implements techniques for dynamically discovering and adapting resource and relationship information according to various embodiments of the present disclosure.

With reference to FIG. 6, a flow chart for another exemplary resource and relationship adaptation process 600 (configured according to an embodiment of the present disclosure) is illustrated. For ease of understanding, process 600 is described in conjunction with cloud computing environment 400 of FIG. 4. Process 600, which executes on discovery manager 410, begins (e.g., in response to a request by a cloud consumer for services) at block 602, at which point control transfers to block 604. In block 604, discovery manager 410 receives a discovery request from VMM 402.

In one or more embodiments, VMM 402 communicates a discovery request (to discovery manager 410) upon dispatching a VM image to a server (e.g., to provide a service for a cloud consumer) or upon migrating a VM image. While the discussion herein focuses on a single VM image, it should be appreciated that the techniques disclosed herein are broadly applicable to one or more VM images. Next, in block 606, discovery manager 410 initiates discovery for the VM image to determine resource and relationship information for the VM image. As is illustrated in FIG. 4, storage 420 includes resource and relationship information (RRI) for VM1 404, VM2 406, and VM3 408 (labeled RRI1 405, RRI2 407, and RRI3 409, respectively). For example, when VM1 404 is dispatched, RRI1 405 is created by discovery manager 410. Then, in block 608, discovery manager 410 stores the resource and relationship information for the VM image. For example, the discovery manger 410 may store the resource and relationship information in one or more non-volatile storage devices of a storage area network (SAN) or network attached storage (NAS) included in cloud computing environment 400. Following block 608, control transfers to block 610 where process 600 ends and control returns to a calling process.

With reference to FIG. 7, a flow chart for yet another exemplary resource and relationship adaptation process 700 (configured according to an embodiment of the present disclosure) is illustrated. For ease of understanding, process 700 is described in conjunction with cloud computing environment 400 of FIG. 4. Process 700, which executes on discovery manager 410, begins (e.g., in response to a request by a cloud consumer for services) at block 702, at which point control transfers to block 704. In block 704, discovery manager 410 receives an invalidate request from VMM 402. In one or more embodiments, VMM 402 communicates an invalidate request (to discovery manager 410) upon migrating or terminating a VM image. While the discussion herein focuses on a single VM image, it should be appreciated that the techniques disclosed herein are broadly applicable to one or more VM images.

Next, in block 706, discovery manager 410 invalidates (e.g., deletes) stored resource and relationship information for the terminated or migrated VM image. As is illustrated in FIG. 4, storage 420 includes resource and relationship information (RRI) for VM1 404, VM2 406, and VM3 408 (labeled RRI1 405, RRI2 407, and RRI3 409, respectively). As one example, when VM1 404 is migrated, RRI1 405 is invalidated by discovery manager 410 and RRI1' 411 is later created (in response to a discovery request) by discovery manager 410. For example, the resource and relationship information may be stored in one or more non-volatile storage devices of, for example, a SAN or a NAS (or a combination thereof) included in cloud computing environment 400. Following block 706, control transfers to block 708 where process 700 ends and control returns to a calling process.

In the flow charts above, the methods depicted in FIGS. 5-7 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for dynamically discovering and adapting resource and relationship information in virtualized computing environments, comprising:
    receiving, by a discovery manager, a discovery request for a virtual machine image that was created within a virtualized computing environment, wherein the discovery request is generated by a virtual machine monitor that is configured to manage the virtual machine image for a client;
    in response receiving the discovery request, discovering, using the discovery manager, resource and relationship information for the virtual machine image;
    in response to receiving an invalidate request for the virtual machine image, invalidating, using the discovery manager, the resource and relationship information for the virtual machine image, wherein the invalidation request is received responsive to deactivation of the virtual machine image in the virtualized computing environment, and wherein the invalidate request is generated by the virtual machine monitor;
    storing, using the discovery manager, the resource and relationship information in a database; and,
    in response to the virtual machine monitor initiating migration of the virtual machine image:
        invalidating the resource and relationship information of the virtual machine image; and
        in response to completion of the migration of the virtual machine image, the discovery manager discovering the resource and relationship information for the migrated virtual machine image.

2. The method of claim 1, wherein the database is included in a storage area network or network attached storage.

3. The method of claim 1, the method further comprising:
    in response to the virtual machine monitor creating a new virtual machine image, the discovery manager receiving a notification to update resource and relationship information for the new virtual machine image and any environments associated with the new virtual machine image; and
    in response to receiving the notification to update the resource and relationship information for the new virtual machine image and any environments associated with the new virtual machine image, the discovery manager collecting the resource and relationship information for the new virtual machine image and initiating storage, within the database, of an updated resource and relationship information for the VM image;
    wherein the resource and relationship information includes information on resources associated with the virtual machine image and relationships between the virtual machine image and other components in the virtualized computing environment; and wherein invalidating the resource and relationship information for the virtual machine image further comprises deleting the resource and relationship information associated with the virtual machine image from one or more non-volatile storage devices.

4. The method of claim 1, wherein discovering the resource and relationship information for the virtual machine image further comprises, the discovery manager performing an application mapping that scans the virtualized computing environment in near real-time to discover interdependencies and relationships between one or more of: applications, computer systems, and network devices.

5. The method of claim 1, wherein the discovery manager is a Tivoli Application Dependency Discovery Manager.

6. The method of claim 1, wherein the virtualized computing environment is a cloud computing environment, and wherein the migration is initiated in response to one or more of:
    the virtual machine monitor balancing a load of a plurality of physical servers within the virtualized computing environment to comply with a service level agreement; and
    the virtual machine monitor provisioning the virtualized computing environment in response to a requested increase in service.

7. The method of claim 1, wherein the virtualized computing environment is a cloud computing environment, and wherein the migration is initiated in response to one or more of:
    the virtual machine monitor provisioning the virtualized computing environment in response to an expected increase in services; and
    the virtual machine monitor offloading a workload on a platform requiring service.

8. A computer program product for dynamically discovering and adapting resource and relationship information in virtualized computing environments, the computer program product comprising:
    a computer-readable storage memory having computer readable program code embodied therein, wherein the computer-readable program code, when executed by a data processing system, causes the data processing system to execute a discovery manager that is configured to:
        receive, a discovery request for a virtual machine image that was created within a virtualized computing environment, wherein the discovery request is generated by a virtual machine monitor that is configured to manage the virtual machine image for a client;
        in response to receiving the discovery request, discover resource and relationship information for the virtual machine image;
        in response to receiving an invalidate request for the virtual machine image, invalidate the resource and relationship information for the virtual machine image, wherein the invalidation request is received responsive to deactivation of the virtual machine image in the virtualized computing environment, and wherein the invalidate request is generated by the virtual machine monitor; and
        in response to the virtual machine monitor initiating migration of the virtual machine image:
            invalidating the resource and relationship information of the virtual machine image; and
            in response to completion of the migration of the virtual machine image, the discovery manager discovering the resource and relationship information for the migrated virtual machine image.

9. The computer program product of claim 8, wherein the virtualized computing environment is a cloud computing environment and the computer-readable program code, when executed by the data processing system, further causes the data processing system to:
    store the resource and relationship information in a database of the cloud computing environment.

10. The computer program product of claim 9, the discovery manager being further configure to:
  in response to the virtual machine monitor creating a new virtual machine image, receive a notification to update the resource and relationship information for the new virtual machine image and any environments associated with the new virtual machine image; and
  in response to receiving the notification to update the resource and relationship information for the new virtual machine image and any environments associated with the new virtual machine image, collect the resource and relationship information for the new virtual machine image and initiating storage, within the database, of an updated resource and relationship information for the VM image;
  wherein the resource and relationship information includes information on resources associated with the virtual machine image and relationships between the virtual machine image and other components in the virtualized computing environment, and wherein invalidating the resource and relationship information for the virtual machine image further comprises deleting the resource and relationship information associated with the virtual machine image from one or more non-volatile storage devices.

11. The computer program product of claim 8, wherein discovering the resource and relationship information for the virtual machine image further comprises, perform an application mapping that scans the virtualized computing environment in near real-time to discover interdependencies and relationships between one or more of: applications, computer systems, and network devices.

12. The computer program product of claim 8, wherein the discovery manager is a Tivoli Application Dependency Discovery Manager.

13. The computer program product of claim 9, wherein the migration is initiated in response to one or more of:
  the virtual machine monitor balancing a load of a plurality of physical servers within the virtualized computing environment to comply with a service level agreement; and
  the virtual machine monitor offloading a workload on a platform requiring service.

14. The computer program product of claim 9, wherein the migration is initiated in response to one or more of:
  the virtual machine monitor provisioning the virtualized computing environment in response to a requested increase in service; and
  the virtual machine monitor provisioning the virtualized computing environment in response to an expected increase in services.

15. A data processing system, comprising:
a memory; and
a processor coupled to the memory, wherein the processor is configured to execute a discovery manager that is configured to:
  receive, a discovery request for a virtual machine image that was created within a virtualized computing environment, wherein the discovery request is generated by a virtual machine monitor that is configured to manage the virtual machine image for a client;
  in response to receiving the discovery request, discover resource and relationship information for the virtual machine image;
  in response to receiving an invalidate request for the virtual machine image, invalidate the resource and relationship information for the virtual machine image, wherein the invalidation request is received responsive to deactivation of the virtual machine image in the virtualized computing environment, and wherein the invalidate request is generated by the virtual machine monitor; and
  in response to the virtual machine monitor initiating migration of the virtual machine image:
    invalidating the resource and relationship information of the virtual machine image; and
    in response to completion of the migration of the virtual machine image, the discovery manager discovering the resource and relationship information for the migrated virtual machine image.

16. The data processing system of claim 15, wherein the processor core is further configured to:
  store the resource and relationship information in a database, wherein the database is included in a storage area network or network attached storage.

17. The data processing system of claim 16, wherein the processor core is further configured to:
  in response to the virtual machine monitor creating a new virtual machine image, receive a notification to update the resource and relationship information for the new virtual machine image and any environments associated with the new virtual machine image; and
  in response to receiving the notification to update the resource and relationship information for the new virtual machine image and any environments associated with the new virtual machine image, collect the resource and relationship information for the new virtual machine image and initiating storage, within the database, of an updated resource and relationship information for the VM image;
  wherein the resource and relationship information includes information on resources associated with the virtual machine image and relationships between the virtual machine image and other components in the virtualized computing environment, and wherein invalidating the resource and relationship information for the virtual machine image further comprises deleting the resource and relationship information associated with the virtual machine image from one or more non-volatile storage devices.

18. The data processing system of claim 15, wherein discovering the resource and relationship information for the virtual machine image further comprises, perform an application mapping that scans the virtualized computing environment in near real-time to discover interdependencies and relationships between one or more of: applications, computer systems, and network devices.

19. The data processing system of claim 15, wherein the discovery manager is a Tivoli Application Dependency Discovery Manager.

20. The data processing system of claim 15, wherein the virtualized computing environment is a cloud computing environment, and wherein the migration is initiated in response to one or more of:
  the virtual machine monitor balancing a load of a plurality of physical servers within the virtualized computing environment to comply with a service level agreement;
  the virtual machine monitor provisioning the virtualized computing environment in response to a requested increase in service;
  the virtual machine monitor provisioning the virtualized computing environment in response to an expected increase in services; and the virtual machine monitor offloading a workload on a platform requiring service.

* * * * *